Sept. 17, 1963 R. BEACOM ET AL 3,103,840
STEADY REST
Filed Feb. 2, 1960 3 Sheets-Sheet 1
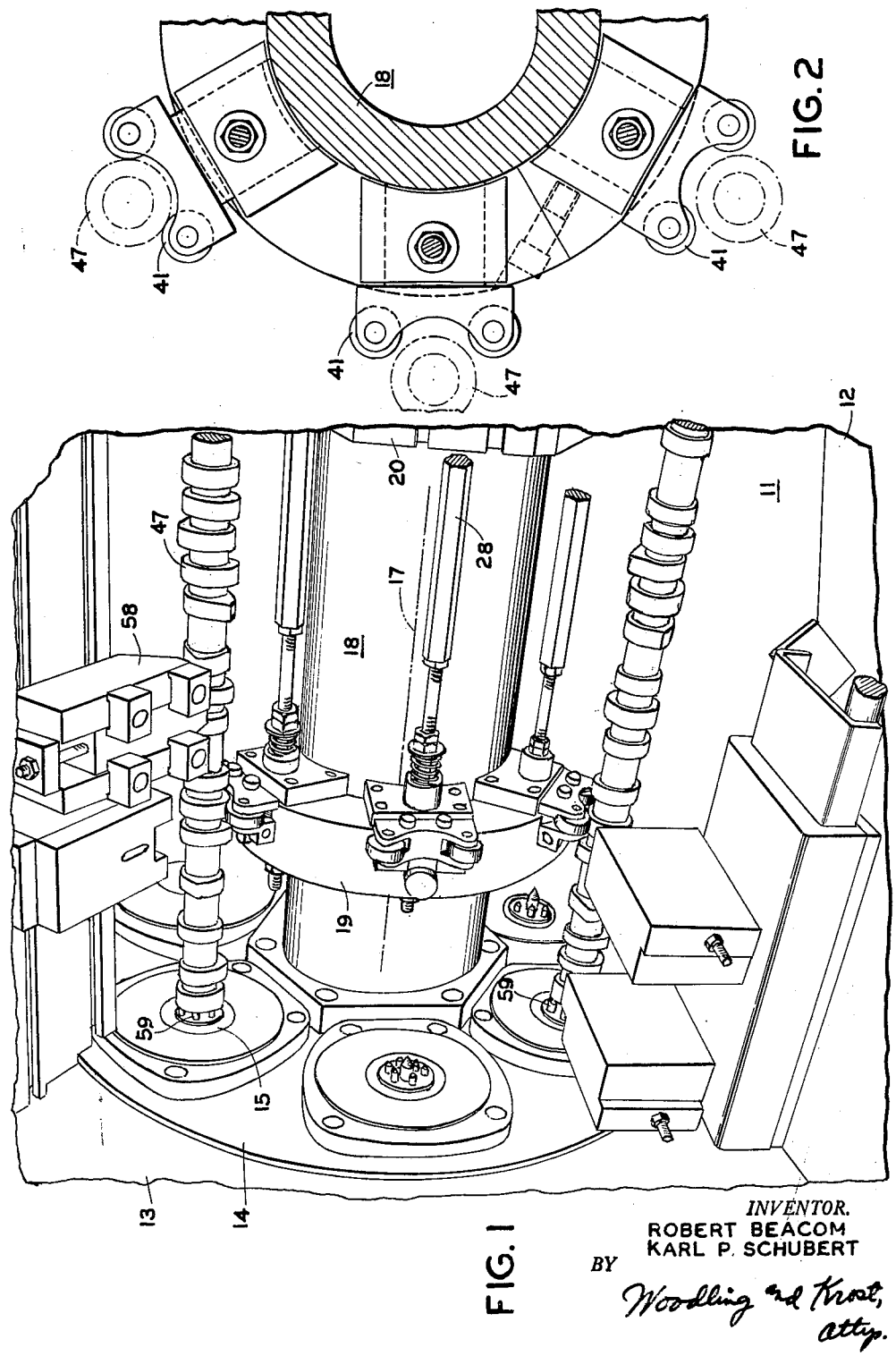
INVENTOR.
ROBERT BEACOM
KARL P. SCHUBERT
BY
Woodling and Krost,
atty.

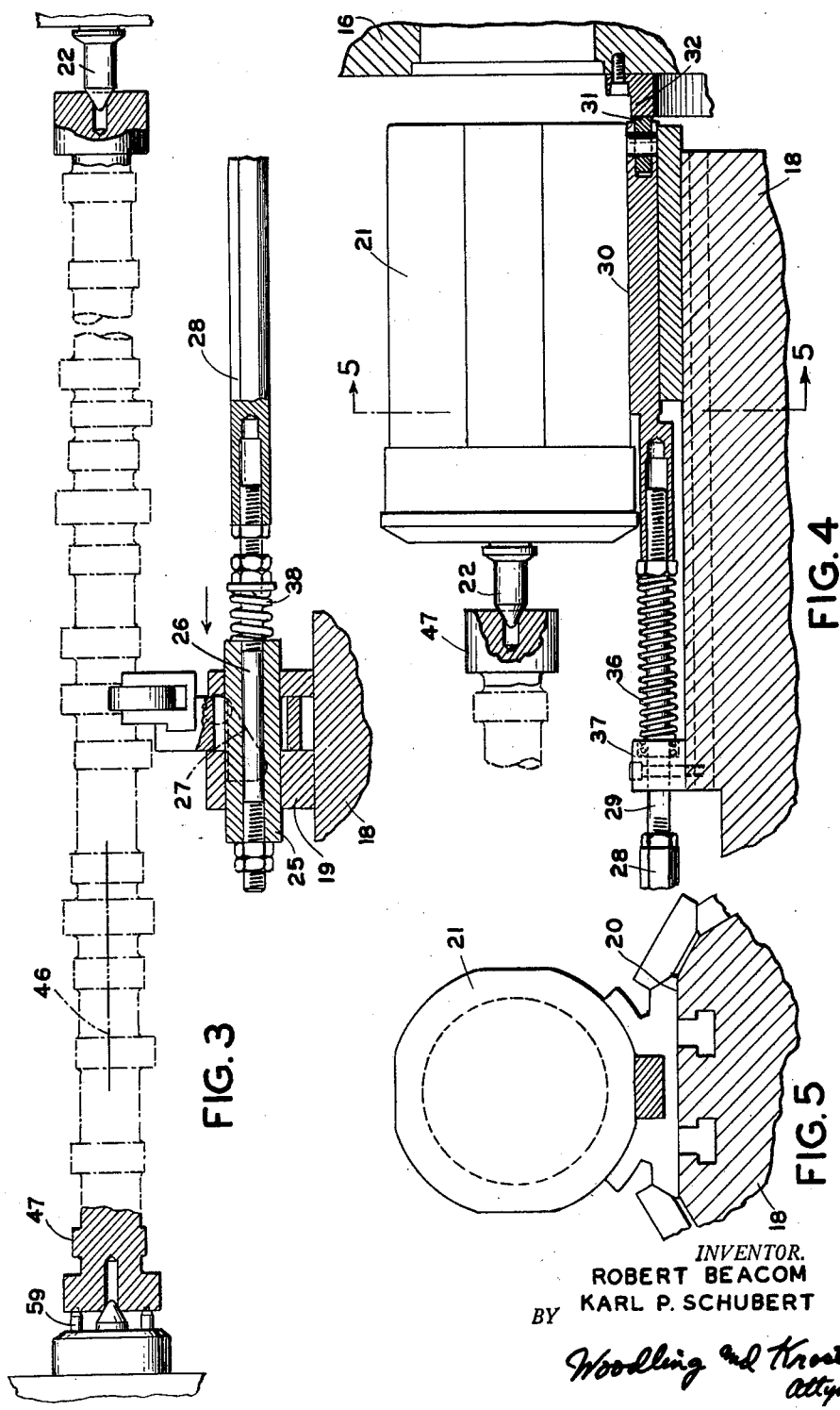

Sept. 17, 1963 R. BEACOM ET AL 3,103,840
STEADY REST
Filed Feb. 2, 1960 3 Sheets-Sheet 3
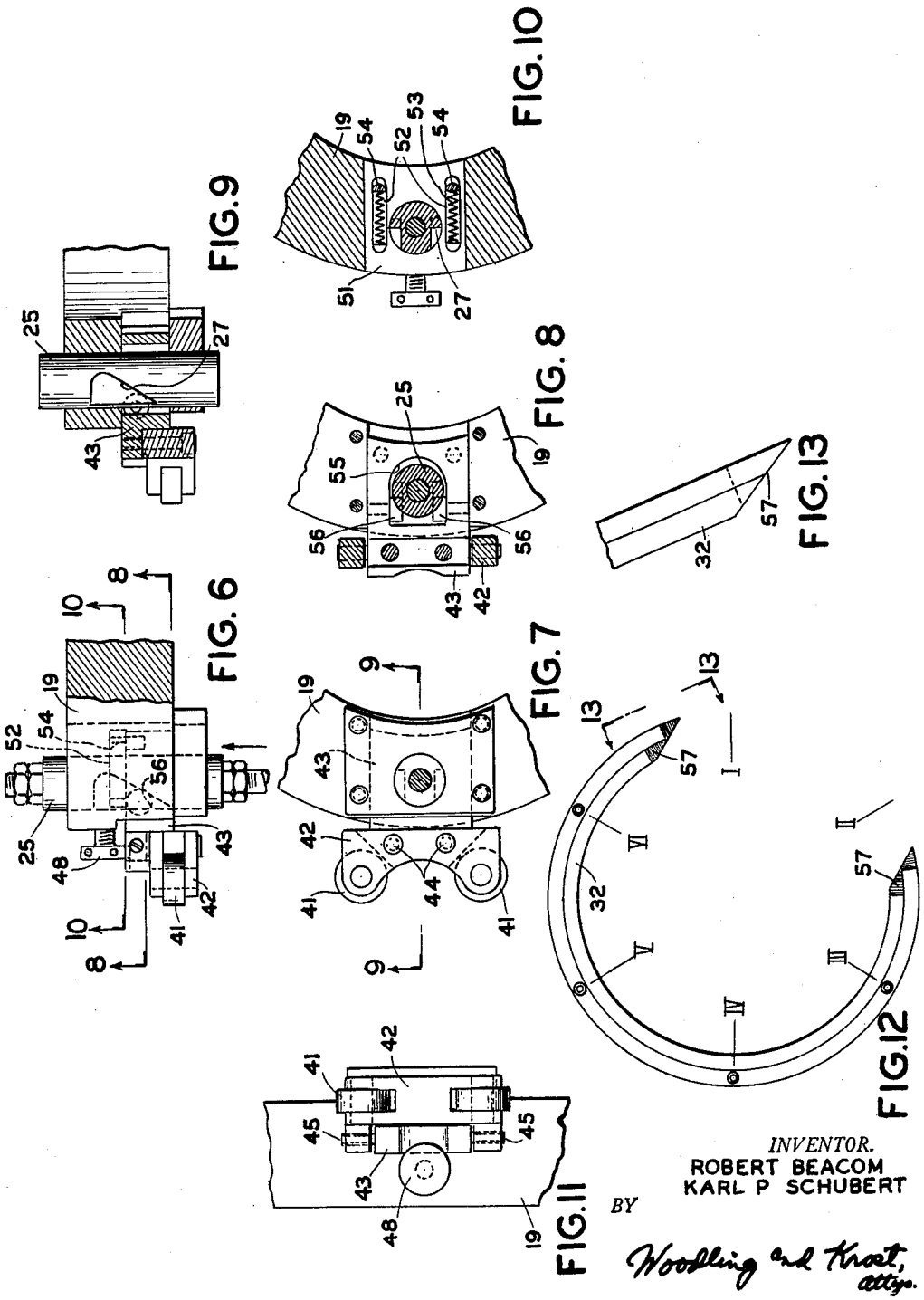
INVENTOR.
ROBERT BEACOM
KARL P SCHUBERT
BY
Woodling and Krost,
attys.

United States Patent Office 3,103,840
Patented Sept. 17, 1963

3,103,840
STEADY REST
Robert Beacom, Bedford, and Karl P. Schubert, Cleveland Heights, Ohio, assignors to The National Acme Company, a corporation of Ohio
Filed Feb. 2, 1960, Ser. No. 6,230
18 Claims. (Cl. 82—38)

The invention relates in general to steady rests for workpieces and more particularly to a steady rest for use in a multiple spindle machine carrying a plurality of workpieces with a steady rest for each of the workpieces.

More specifically, the invention relates to steady rest means in a multiple spindle automatic machine which has an indexable spindle carrier with a loading position for the spindles of the machine and tool means for machining a surface of circular cross section on workpieces. The steady rest means include, in combination, means to support and drive a plurality of workpieces from the plurality of spindles, support means indexable with the spindle carrier, stationary ring cam means mounted on the machine, and the steady rest means for each spindle also including steady rest roller means movably mounted in the support means for movement in a plane substantially normal to the machine axis and adapted for rolling and supporting engagement with any of the workpieces, an actuating roller engageable with the ring cam means and movable longitudinally of the machine, means interconnecting the actuating roller and the steady rest roller means for concurrent movement, and the ring cam means actuating the actuating roller at another spindle position whereby upon indexing of the spindle carrier to place a spindle in said another spindle position the actuating roller is longitudinally moved, and hence, the steady rest roller means are moved into position for peripheral engagement with the workpiece.

Accordingly, an object of the invention is to provide steady rest roller means for long slender workpieces machined on a multiple spindle machine.

Another object of the invention is to provide a workpiece steady rest for a multiple spindle machine wherein the steady rest is selectably actuable for the various spindle positions.

Another object of the invention is to provide a plurality of steady rests for a plurality of workpieces on one machine wherein the steady rests are individually actuable.

Another object of the invention is to provide a steady rest for a rotatable workpiece wherein a cam movement parallel to the axis is changed by another cam into a movement generally perpendicular to the workpiece axis.

Another object of the invention is to provide steady rest roller means selectively and automatically placed in supporting peripheral engagement with a workpiece.

Other objects and a fuller understanding of the invention may be had by referring to the following description and claims, taken in conjunction with the accompanying drawings, in which:

FIGURE 1 is a partial perspective view of a complete multiple spindle machine embodying the invention;

FIGURE 2 is a vertical section through the machine showing the steady rest rollers;

FIGURE 3 is a longitudinal view partially in section through the steady rest and showing diagrammatically a workpiece;

FIGURE 4 is a longitudinal view partially in section of the end of the workpiece and the support thereof;

FIGURE 5 is a section on line 5—5 of FIGURE 4;

FIGURE 6 is a partial longitudinal view of the steady rest rollers;

FIGURE 7 is an end view of the steady rest shown in FIGURE 6;

FIGURE 8 is a sectional view on line 8—8 of FIGURE 6;

FIGURE 9 is a sectional view on line 9—9 of FIGURE 7;

FIGURE 10 is a sectional view on line 10—10 of FIGURE 6;

FIGURE 11 is a longitudinal view looking at the steady rest rollers shown in FIGURE 7;

FIGURE 12 is a transverse elevational view of the stationary cam ring means on the machine; and FIGURE 13 is an enlarged partial view on line 13—13 of FIGURE 12.

FIGURE 1 generally shows the tooling area of a multiple spindle automatic machine 11 having a frame 12, a headstock 13 and a spindle carrier 14. At the right end of the frame 12 is a gearbox 16 not shown in FIGURE 1, but shown in FIGURE 4. The machine 11 has a longitudinal axis 17 and extending coaxially therewith is a center block 18 which is indexable with the spindle carrier 14 and extends from the headstock 13 to the gearbox 16. The left end of this center block 18 as viewed in FIGURE 1, is cylindrical and carries a support 19 which also indexes with the center block 18. The right end of the center block 18 is provided with a plurality of faces 20 equal in number to the number of spindles 15, shown in this case as being six in number. Accordingly, six steady rests are provided, one for each spindle. Each face 20 of the center block 18 carries a tailstock 21 with a movable center 22. The movable center 22 may be power actuated, such as by air or liquid or other means.

As better shown in FIGURES 3 and 4, illustrating one of the six steady rests, the support 19 slidably mounts a longitudinal movable shaft 25 which is hollow to receive a rod 26. The shaft 25 has two wedge shaped cam surfaces or faces 27. The rod 26 is threaded on each end and one end is threaded with a right-hand thread into a connector 28. The connector 28 is connected by a left-hand thread to a two piece actuating rod 29 which is slidably journalled at 30 through the respective tailstock 21. An actuating roller 31 is journalled on the end of the actuating rod 29 for engagement with and actuation by a stationary cam ring 32. This stationary cam ring 32 is fixedly attached to a gearbox 16 in a plane normal to the machine axis 17 and has high and low parts as established by discontinuity of this cam ring, best shown in FIGURE 12.

A first compression spring 36 acts between the actuating rod 29 and an abutment 37 on the center block 18 to urge this actuating rod to the right as viewed in FIGURE 4, so that the actuating roller 31 is urged into engagement with the cam ring 32. The fact that the connector 28 has right-hand and left-hand threads on opposite ends permits assembly and dis-assembly of these parts and also provides longitudinal adjustment of the wedge shaped cam faces 27.

A second compression spring 38 acts between a nut on the rod 26 and the shaft 25 to urge the cam faces 27 to the left as viewed in FIGURES 3 and 4; hence, to urge these cam faces 27 to the left relative to the rod 26.

The FIGURES 7 through 11 better show the internal construction of the mechanism actuating steady rest or supporting rollers 41. These rollers are journalled on a yoke 42 which is fastened to a slide 43 by screws 44. Screws 45 provide a slight lateral adjustment to the rollers 41 relative to the axis 46 of the respective spindle 15 or workpiece 47. The slide 43 is mounted in the support 19 for a sliding movement radially relative to the machine axis 17 and, accordingly, radially toward or away from the respective workpiece 47. A headed thumb screw 48 is screwed into the support 19 and acts as an adjustable stop for the slide 43 by overlying an outer face of this slide 43.

The support 19 has a slide journal surface 51 for receiving the slide 43 and in this surface recessed into the support 19 are two slots 52 receiving compression springs 53. These compression springs bear against plug in the outer ends of the slots 52 and bear against movable pins 54 which are fixed in the slide 43. Thus, the springs 53 urge the slide 43 inwardly relative to the machine axis 17. The shaft 25 passes through an elongated aperture 55 in the slide 43 and the slide 43 journals cam follower rollers 56 for cooperating engagement with the cam faces 27.

The discontinuous cam ring 32 is better shown in FIGURES 12 and 13 with the six spindle positions marked in Roman numerals on this FIGURE 12. The first spindle position is horizontally forward of the machine axis 17 and this is the loading and unloading position. In FIGURE 1 this first spindle position is shown as being empty as it would be after removing a completed workpiece. The spindle carrier 14 indexes in a counterclockwise manner as viewed in FIGURE 1 or in a clockwise manner as viewed in FIGURE 12. The lowermost workpiece shown in FIGURE 1 is in the second spindle position and FIGURE 12 shows that the cam ring 32 is also discontinuous at this point as well as in the loading position. This discontinuity may be considered to be a low part of the cam ring 32. The high part of the cam ring 32 extends through third, fourth, fifth and sixth spindle positions, and hence, is of about 240° arcuate extent for this six spindle machine 11. Inclined faces 57 are provided at the beginning and end of the discontinuous cam ring 32 in order to provide smooth engagement and disengagement with the actuating roller 31. FIGURE 2 diagrammatically shows workpieces 47 in the first and second spindle positions which are not supported by the steady rest rollers 41. However, in the sixth spindle position at the top of FIGURE 2 the rollers 41 are shown as being in engagement with the workpiece 47.

The springs 36, 38 and 53 function together to keep the rollers 41 urged toward the axis 17 in the machine and to maintain the cam follower rollers 56 in engagement with the cam faces 27 and to maintain the actuating roller 31 in engagement with the cam ring 32. The spring 38 is a stiffer spring than spring 36 and acts as a safeguard and also resists the force of a tool, such as in a tool holder 58 which may be cutting the workpiece in any one of the spindle positions 3 through 6.

Normally the connector 28 is threadably adjusted so that when the actuating roller 31 is in engagement with the cam ring 32 then the steady rest rollers 41 will be at the correct radial distance relative to the workpiece axis 46 to support the previously machined surface on the workpiece 47 at that longitudinal point on the workpiece. The headed thumb screw 48 engages the outer surface of the slide 43 to prevent this slide from moving too far outwardly, and accordingly, this may be used as an adjustable stop to adjust the radial distance of the steady rest rollers 41 relative to the workpiece axis 46. In such case, the connector 28 may be adjusted so that spring 38 is slightly compressed. During machining operations on the workpiece 47, the force of the tool tends to deflect the workpiece 47 and this is transmitted through the rollers 41 and slide 43 to the spring 38, and thus, spring 38 is made stiff enough to resist this tool force.

The workpiece 47 shown being machined in the machine 11 is illustrated as a long slender cam shaft which has several eccentric lobes which are not to be machined in this operation, but has other concentric surfaces to be machined to a circular cross section to be used either for bearing surfaces or to later be hobbed into gears. In one setup of this machine 11 the workpiece may be loaded at the first spindle position and then in the second spindle position the workpiece 47 turned cylindrical at the longitudinal position on the workpiece corresponding to the various steady rests. As the spindle carrier 14 is indexed to the third spindle position the actuating roller 31 rides up the inclined face 57 of the cam ring 32. This longitudinally moves the actuating rod 29 and the cam faces 27 laterally move the slide 43 until it engages the headed thumb screw 48. Any additional longitudinal movement of hte actuating rod 29 is taken up by compression of the spring 38. This radially outward movement of the slide 43 positions the steady rest or supporting rollers 41 in supporting peripheral engagement with the previously machined surface on the workpiece 47.

Accordingly, at the third spindle position and also at the fourth, fifth and sixth spindle positions other machining work may be performed at other longitudinal positions on the workpieces and the tool force will be resisted by the respective steady rests.

The workpieces 47 may be supported by and driven from the individual spindles 15 in any desired manner and in this case the movable center 22 in the tailstock 21 has been shown as being moved by a power tailstock to engage the respective workpieces. Also at the spindles 15 driving pins 59 are provided to engage the end face of the workpiece. This permits the cylindrical surface contiguous with the end face to be machined.

The cam ring 32 and actuating roller 31 are means to provide longitudinal movement and the actuating rod 29, connector 28 and cam faces 27 are interconnecting means to provide radial movement to the slide 43, yoke 42 and steady rest rollers 41.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Steady rest means for a spindle of a multiple spindle automatic machine having an indexable spindle carrier, the spindles of said machine having a loading position, means to support and drive a plurality of workpieces from the plurality of spindles, said steady rest means comprising, in combination, support means indexable with the spindle carrier, stationary ring cam means mounted on said machine, steady rest roller means movably mounted in said support means for movement in a plane substantially normal to said machine axis and adapted for rolling and supporting engagement with any said workpiece, an actuating roller engageable with said ring cam means and movable in a direction substantially parallel to the axis of said machine, means interconnecting said actuating roller and said steady rest roller means for concurrent movement, and said ring cam means actuating said actuating roller at another spindle position, whereby upon indexing of the spindle carrier to place a spindle in said another spindle position said actuating roller is longitudinally moved, and hence, said steady rest roller means are moved into position for peripheral engagement with the workpiece in one spindle.

2. In a multiple spindle automatic machine having an indexable spindle carrier, the spindles of said machine having a loading position, the provision of steady rest means for the plurality of spindles, comprising, in combination, means to support and drive a plurality of workpieces from the plurality of spindles, support means indexable with the spindle carrier, said steady rest means for each spindle also including, an actuating rod journalled for sliding movement substantially parallel to the axis of said machine, slide means mounted in said support means for movement in a plane substantially normal to said machine axis, means interconnecting said actuating rod and said slide means for concurrent movement, steady rest roller means on said slide means adapted for rolling and supporting engagement with any said workpiece, and means to actuate said actuating rod at another spindle position, whereby upon indexing of the spindle carrier to said another spindle position said actuating rod is longitudinally moved, and hence, said steady rest roller means are moved into position for peripheral engagement with the workpiece.

3. Steady rest means for a spindle of a multiple spindle automatic machine having an indexable spindle carrier, the spindles of said machine having a loading position and a second position, tool means on said machine for machining a surface of circular cross section on a given axial portion of workpieces at said second position, means to support and drive a plurality of workpieces from the plurality of spindles, said steady rest means comprising, in combination, support means indexable with the spindle carrier, an actuating rod journalled for sliding movement substantially parallel to the axis of said machine, slide means mounted in said support means for movement in a plane substantially normal to said machine axis, cam and follower means interconnecting said actuating rod and said slide means for concurrent movement, steady rest rollers on said slide means adapted for rolling and supporting engagement with said given axial portion of any said workpiece in one spindle, and means to actuate said actuating rod at a third spindle position, whereby upon indexing of the spindle carrier to said third spindle position said actuating rod is longitudinally moved, and hence, said steady rest rollers are moved into position for peripheral engagement with the machined surface on the workpiece.

4. In a multiple spindle automatic machine having an indexable spindle carrier, the spindles of said machine having a loading position and a second position, a tool slide on said machine carrying a tool for machining a surface of circular cross section on a given axial portion of workpieces at said second position, the provision of steady rest means for the plurality of spindles, comprising, in combination, means to support and drive a plurality of workpieces from the plurality of spindles, support means indexable with the spindle carrier, said steady rest means for each spindle also including, an actuating rod journalled for sliding movement substantially parallel to the axis of said machine, yoke means slidably mounted in said support means for movement in a plane substantially normal to said machine axis, cam and follower means interconnecting said actuating rod and said yoke means for concurrent movement, steady rest rollers on said yoke means adapted for rolling and supporting engagement with said given axial portion of any said workpiece, and stationary ring cam means on said machine to actuate said actuating rod at a third spindle position, whereby upon indexing of the spindle carrier to said third spindle position said actuating rod is longitudinally moved, and hence, said steady rest rollers are moved into position for peripheral engagement with the machined surface on the workpiece.

5. Steady rest means for a spindle of a multiple spindle automatic machine having an indexable spindle carrier and means to support and drive a plurality of workpieces from the plurality of spindles, said steady rest means comprising, in combination, support means indexable with the spindle carrier, a cam ring with high and low parts and carried on the machine in a plane normal to the machine axis, an actuating rod journalled for sliding movement substantially parallel to the axis of said machine, an actuating roller on said actuating rod engageable with said cam ring, yoke means slidably mounted in said support means for movement in a plane substantially normal to said machine axis, means interconnecting said actuating rod and said yoke means for concurrent movement, steady rest rollers on said yoke means adapted for rolling and supporting engagement with any said workpiece in one spindle, whereby upon indexing of the spindle carrier to a given spindle position said actuating roller engages the high part of said cam ring to longitudinally move said actuating rod, and hence move said steady rest rollers into position for peripheral engagement with the workpiece.

6. In a multiple spindle automatic machine having an indexable spindle carrier, the provision of steady rest means for the plurality of spindles, comprising, in combination, means to support and drive a plurality of workpieces from the plurality of spindles, support means indexable with the spindle carrier, a cam ring with high and low parts and carried on the machine in a plane normal to the machine axis, said steady rest means for each spindle also including, an actuating rod journalled for sliding movement substantially parallel to the axis of said machine, an actuating roller on said actuating rod engageable with said cam ring, slide means mounted in said support means for movement in a plane substantially normal to said machine axis, means interconnecting said actuating rod and said slide means for concurrent movement, steady rest roller means on said slide means adapted for rolling and supporting engagement with any said workpiece, and the low part of said cam ring lying adjacent a loading position of the spindles of said machine, whereby upon indexing of the spindle carrier to another spindle position said actuating roller engages the high part of said cam ring to longitudinally move said actuating rod, and hence, move said steady rest roller means into position for peripheral engagement with the workpiece.

7. In a multiple spindle automatic machine having an indexable spindle carrier, the provision of steady rest means, comprising, in combination, means to support and drive a plurality of workpieces from the plurality of spindles, support means indexable with the spindle carrier, a cam ring with high and low parts and carried on the machine in a plane normal to the machine axis, an actuating rod journalled for sliding movement substantially parallel to the axis of said machine, an actuating roller on said actuating rod engageable with said cam ring, yoke means slidably mounted in said support means for movement in a plane substantially normal to said machine axis, means interconnecting said actuating rod and said yoke means for concurrent movement, steady rest rollers on said yoke means adapted for rolling and supporting engagement with a given axial portion of any said workpiece, the low part of said cam ring lying adjacent a loading position and a second position of the spindles of said machine, and means on said machine for machining a surface of circular cross section on said given axial portion of a workpiece at said second position, whereby upon indexing of the spindle carrier to a third spindle position said actuating roller engages the high part of said cam ring to longitudinally move said actuating rod, and hence, move said steady rest rollers into position for peripheral engagement with the machined surface on the workpiece.

8. In a multiple spindle automatic machine having an indexable spindle carrier, the provision of steady rest means for the plurality of spindles, comprising, in combination, means to support and drive a plurality of workpieces from the plurality of spindles, support means indexable with the spindle carrier, a cam ring with high and low parts and carried on the machine in a plane normal to the machine axis, said steady rest means also including for each spindle an actuating rod journalled for sliding movement substantially parallel to the axis of said machine, an actuating roller on said actuating rod engageable with said cam ring, a yoke slidably mounted in said support means for movement in a direction perpendicular to said machine axis, means interconnecting said actuating rod and said yoke for concurrent movement, steady rest rollers on the two ends of said yoke adapted for rolling and supporting engagement with a given axial portion of any said workpiece, adjustable stop means limiting outward movement of said steady rest rollers, the low part of said cam ring lying adjacent a loading position and a second position of the spindles of said machine, and means on said machine for machining a surface of circular cross section on said given axial portion of a workpiece at said second position, whereby upon indexing of the spindle carrier to a third spindle position said actuating roller engages the high part of said cam ring to longitudinally move said actuating rod, and hence, move said steady rest rollers into position for peripheral engagement with the machined surface on the workpiece.

9. In a multiple spindle automatic machine having an indexable spindle carrier, the provision of steady rest means, comprising, in combination, means to support and drive a plurality of workpieces from the plurality of spindles, support means indexable with the spindle carrier, a cam ring with high and low parts and fixedly attached on the machine in a plane normal to the machine axis, a longitudinally movable cam in said support means, an actuating rod journalled for sliding movement substantially parallel to the axis of said machine, an actuating roller on said actuating rod engageable with said cam ring, means interconnecting said actuating rod and said cam, a cam follower slidably mounted in said support means for movement in a direction perpendicular to said machine axis, a yoke connected to said cam follower, steady rest rollers on the two ends of said yoke adapted for rolling and supporting engagement with a given axial portion of any said workpiece, the low part of said cam ring lying adjacent a loading position and a second position of the spindles of said machine, and means on said machine for machining a surface of circular cross section on said given axial portion of a workpiece at said second position, whereby upon indexing of the spindle carrier to a third spindle position said actuating roller engages the high part of said cam ring to longitudinally move said cam, and hence, move said steady rest rollers into position for peripheral engagement with the machined surface on said workpiece.

10. In a multiple spindle automatic machine having a frame with an indexable spindle carrier, the provision of steady rest means, comprising, in combination, a center block indexable with the spindle carrier, means to support and drive a plurality of workpieces from the plurality of spindles, support means mounted on said center block, a cam ring with high and low parts and fixedly attached on the machine in a plane normal to the machine axis, a longitudinally movable cam in said support means, an actuating rod journalled for sliding movement substantially parallel to the axis of said machine, an actuating roller on said actuating rod engageable with said cam ring, means interconnecting said actuating rod and said cam, a cam follower slidably mounted in said support means for movement in a direction perpendicular to said machine axis, a yoke connected to said cam follower, support rollers on the two ends of said yoke adapted for rolling and supporting engagement with a given axial portion of any said workpiece, adjustable stop means limiting outward movement of said support rollers, the low part of said cam ring lying adjacent a loading position and a second position of the spindles of said machine, and means on said machine for machining a surface of circular cross section on said given axial portion of a workpiece at said second position, whereby upon indexing of the spindle carrier to a third spindle position said actuating roller engages the high part of said cam ring to longitudinally move said cam, and hence, move said cam follower and support rollers into supporting peripheral engagement with the machined surface on said workpiece.

11. In a multiple spindle automatic chucking machine having a frame with a spindle carrier and a head stock on said frame, the provision of workpiece lateral support means including a center block indexable with the spindle carrier, means to drive a plurality of elongated workpieces from the plurality of spindles, a support mounted on said center block, a longitudinally movable cam in said support, an actuating rod journalled for sliding movement substantially parallel to the axis of said machine, adjustable screw means interconnecting said actuating rod and said cam, a cam follower slidably mounted in said support for movement in a direction perpendicular to said machine axis, a yoke connected to said cam follower, rollers on the two ends of said yoke adapted for rolling and supporting engagement with a given axial portion of any said workpiece, a discontinuous ring fixedly attached on the machine in a plane normal to said machine axis, said actuating rod carrying an actuating roller engageable with said discontinuous ring, the discontinuity of said ring lying adjacent a loading position and a second position of said machine, spring means urging said cam follower inwardly toward said axis and into engagement with said cam and urging said actuating roller into engagement with said discontinuous ring, a tool slide on said machine carrying a tool for machining a surface of circular cross section on said given axial portion of said workpiece at said second position whereby upon indexing of the spindle carrier to a third position said actuating roller engages said discontinuous ring to longitudinally move said cam, and hence, move said cam follower and support rollers into supporting peripheral engagement with the machined surface on said workpiece, and said spring means resisting the tool loading force in said third position of said spindle carrier.

12. In a multiple spindle automatic chucking machine having a frame with a spindle carrier and a headstock on said frame, the provision of a center block indexable with the spindle carrier, a plurality of movable centers on said center block to support one end of a plurality of elongated workpieces, the other end of the workpieces centered on and driven from the plurality of spindles, a support mounted on said center block, a longitudinally movable cam in said support, an actuating rod journalled for sliding movement substantially parallel to the axis of said machine, a discontinuous cam ring fixedly attached on the machine in a plane normal to said machine axis, said actuating rod carrying an actuating roller engageable with said discontinuous cam ring, first spring means acting to urge said roller into engagement with said discontinuous cam ring, adjustable screw means and second spring means interconnecting said actuating rod and said cam, a cam follower slidably mounted in said support for movement in a direction perpendicular to said machine axis, a yoke connected to said cam follower, support rollers on the two ends of said yoke adapted for rolling and supporting engagement with a given axial portion of any said workpiece, said second spring means being stiffer than said first spring means and urging said cam away from said actuating roller, and hence, urging said support rollers outwardly relative to said machine axis, adjustable stop means limiting outward movement of said support rollers, third spring means urging said cam follower inwardly toward said axis and into engagement with said cam, the discontinuity of said cam ring lying adjacent a loading position and a second position of said machine, a tool slide on said machine carrying a tool for machining a surface of circular cross section on said given axial portion of said workpiece at said second position whereby upon indexing of the spindle carrier to a third position said actuating roller engages said discontinuous cam ring to longitudinally move said cam, and hence, move said cam follower and support rollers into supporting peripheral engagement with the machined surface on said workpiece.

13. In a multiple spindle automatic chucking machine having a frame and a spindle carrier, a headstock and a gearbox on said frame, the provision of a center block indexable with the spindle carrier, a plurality of movable centers on said center block to support one end of a plurality of elongated workpieces, the other end of the workpieces centered on and driven from the plurality of spindles, said center block having as many faces as spindles in the spindle carrier, a support mounted on said center block, a longitudinally movable cam in said support, an actuating rod journalled for sliding movement through one of said movable centers and aligned substantially parallel to the axis of said machine, adjustable screw means interconnecting said actuating rod and said cam, a cam follower slidably mounted in said support for movement in a direction perpendicular to said machine axis, a yoke connected to said cam follower, support rollers on the two ends of said yoke adapted for rolling and supporting engagement with a given axial portion of any said workpiece, spring means urging said cam follower inwardly toward said axis and into engagement with said cam, a discontinuous ring fixedly attached on the inner face of said gearbox in a plane normal to said machine axis, said actuating rod carrying a roller engageable with said discontinuous ring, the discontinuity of said ring lying adjacent a loading position and a second position of said machine, a tool slide on said machine carrying a tool for machining a cylindrical surface on said given axial portion of said workpiece at said second position whereby upon indexing of the spindle carrier to a third position said actuating roller engages said discontinuous ring to longitudinally move said cam, and hence, move said cam follower and support rollers into supporting peripheral engagement with the machined cylindrical surface on said workpiece.

14. In a multiple spindle a automatic chucking machine having a frame and a spindle carrier, a headstock and a gearbox on said frame, the provision of a center block indexable with the spindle carrier, a plurality of movable centers on said center block to support one end of a plurality of elongated workpieces, the other end of the workpieces centered on and driven from the plurality of spindles, said center block having as many faces as spindles in the spindle carrier, a support mounted on said center block, a longitudinally movable cam in said support, an actuating rod journalled for sliding movement through one of said movable centers and aligned substantially parallel to the axis of said machine, a discontinuous cam ring fixedly attached on the inner face of said gearbox in a plane normal to said machine axis, said actuating rod carrying an actuating roller engageable with said discontinuous cam ring, a first compression spring acting to urge said roller into engagement with said discontinuous cam ring, adjustable screw means and a second compression spring interconnecting said actuating rod and said cam, a cam follower slidably mounted in said support for movement in a direction perpendicular to said machine axis, a yoke connected to said cam follower, support rollers on the two ends of said yoke adapted for rolling and supporting engagement with a given axial portion of any said workpiece, said second compression spring being stiffer than said first compression spring and urging said cam away from said actuating roller, and hence, urging said support rollers outwardly relative to said machine axis, spring means urging said cam follower inwardly toward said axis and into engagement with said cam, the discontinuity of said cam ring lying adjacent a loading position and a second position of said machine, a tool slide on said machine carrying a tool for machining a cylindrical surface on said given axial portion of said workpiece at said second position whereby upon indexing of the spindle carrier to a third position said actuating roller engages said discontinuous cam ring to longitudinally move said cam, and hence, move said cam follower and support rollers into supporting peripheral engagement with the machined cylindrical surface on said workpiece.

15. Steady rest means comprising, in combination, a frame,
indexable means having an axis and journalled on said frame,
means to support and drive a workpiece on said indexable means and indexable therewith into at least first and second indexable positions,
support means indexable with said indexable means,
stationary ring cam means mounted on said frame,
steady rest roller means movably mounted in said support means for movement in a plane substantially normal to said axis and adapted for rolling and supporting engagement with a given axial portion of any said workpiece,
an actuating roller engageable with said ring cam means and movable in a direction substantially parallel to said axis,
means interconnecting said actuating roller and said steady rest roller means for concurrent movement,
and said ring cam means actuating said actuating roller upon indexing of said indexable means from said first to said second indexable position to move said steady rest roller means into position for peripheral engagement with said given axial portion of the workpiece.

16. Steady rest means comprising, in combination, a frame,
an indexable spindle carrier journalled on said frame,
a plurality of spindles on said spindle carrier,
means to support and drive a plurality of workpieces from the plurality of spindles,
support means indexable with said spindle carrier,
stationary ring cam means mounted on said frame,
steady rest roller means movably mounted in said support means for movement in a plane substantially normal to said spindle carrier axis and adapted for rolling and supporting engagement with a given axial portion of any said workpiece in one of said spindles,
an actuating roller engageable with said ring cam means and movable in a direction substantially parallel to said axis of said spindle carrier,
means interconnecting said actuating roller and said steady rest roller means for concurrent movement,
and said ring cam means actuating said actuating roller at a given spindle position, whereby upon indexing of said spindle carrier to said given spindle position, said actuating roller is longitudinally moved and hence said steady rest roller means are moved into position for peripheral engagement with said given axial portion of the workpiece.

17. Steady rest means comprising, in combination, a frame,
an indexable spindle carrier journalled on said frame,
a plurality of spindles on said spindle carrier,
the spindles of said carrier having at least first and second positions,
means to support and drive a plurality of workpieces from the plurality of spindles,
support means indexable with said spindle carrier,
stationary ring cam means mounted on said frame,
steady rest roller means movably mounted in said support means for movement in a plane substantially normal to said spindle carirer axis and adapted for rolling and supporting engagement with a given axial portion of any said workpiece in one of said spindles,
an actuating roller engageable with said ring cam means and movable in a direction substantially parallel to said axis of said spindle carrier,
means interconnecting said actuating roller and said steady rest roller means for concurrent movement,
tool means on said frame for machining a surface of circular cross-section on said given axial portion of a workpiece at said first position,
and said ring cam means actuating said actuating roller at said second spindle position, whereby upon indexing of said spindle carrier to said second spindle position, said actuating roller is longitudinally moved and hence said steady rest roller means are moved into position for peripheral engagement with the machined surface on the workpiece.

18. Steady rest means comprising, in combination, a frame, an indexable spindle carrier having an axis and journalled on said frame,
a plurality of spindles on said spindle carrier,
the spindles of said carrier having at least first and second positions,
means to support and drive a plurality of workpieces from the plurality of spindles,
support means indexable with said spindle carrier,
stationary ring cam means mounted on said frame,
an actuating rod journalled for sliding movement substantially parallel to said spindle carrier axis,
slide means mounted in said support means for movement in a plane substantially normal to said axis,
cam and follower means interconnecting said actuating rod and said slide means for concurrent movement,
steady rest roller means on said slide means adapted for rolling and supporting engagement with a given axial portion of any said workpiece in one of said spindles,
an actuating roller on said actuating rod engageable with said ring cam means,
tool means on said frame for machining a surface of circular cross-section on said given axial portion of a workpiece at said first position,
and said ring cam means actuating said actuating roller at said second spindle position, whereby upon indexing of said spindle carrier to said second spindle position, said actuating roller is longitudinally moved and hence said steady rest rollers are moved into position for peripheral engagement with the machined surface on the workpiece.

References Cited in the file of this patent

UNITED STATES PATENTS

| | | |
|---|---|---|
| 1,401,131 | Blackburn | Dec. 27, 1921 |
| 1,955,220 | Biewend | Apr. 17, 1934 |
| 2,316,010 | Miller | Apr. 6, 1943 |
| 2,592,229 | Alexay | Apr. 8, 1952 |
| 2,718,168 | Kendall | Sept. 20, 1955 |